A. J. SCHORR.
WAGON BRAKE.
APPLICATION FILED FEB. 24, 1920.
1,438,613.
Patented Dec. 12, 1922.
3 SHEETS—SHEET 2.
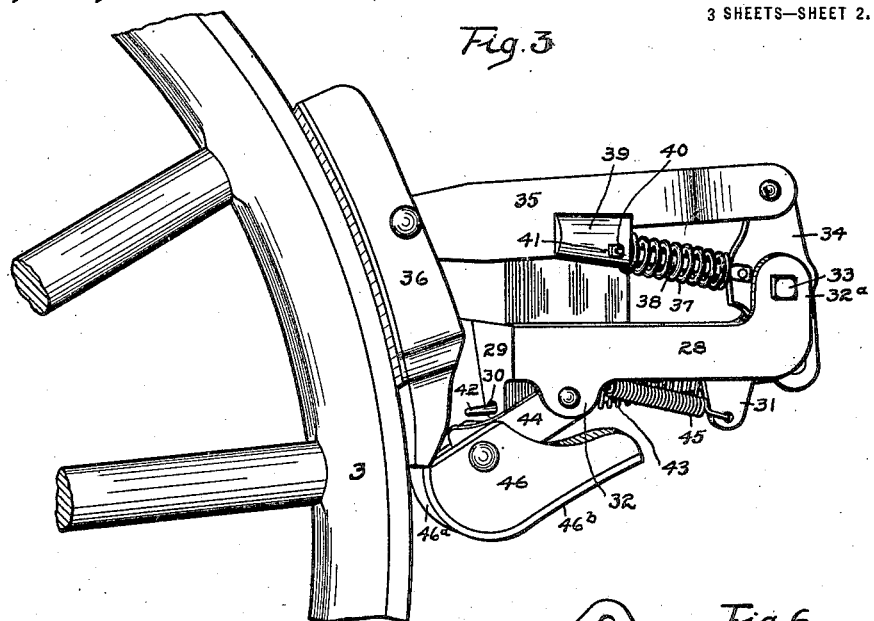
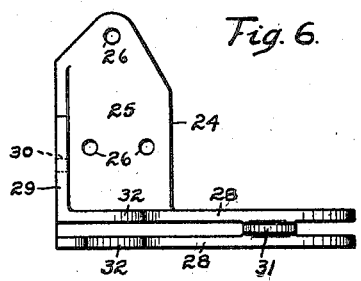
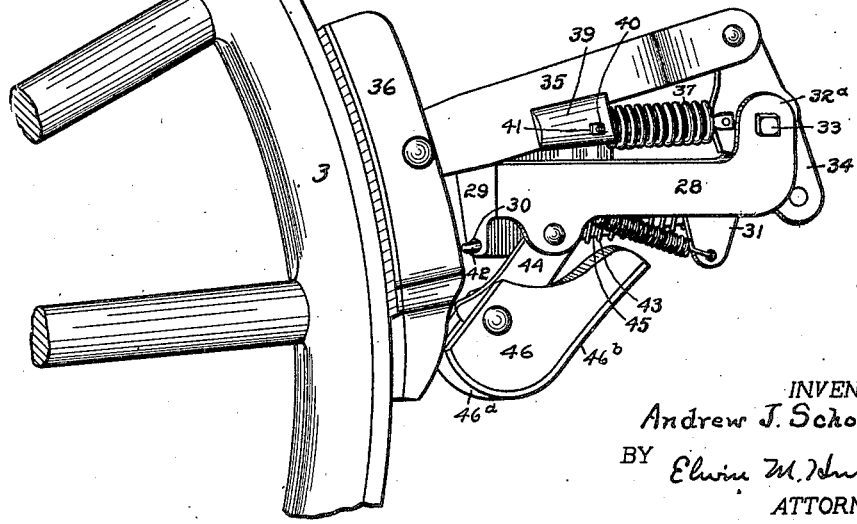
INVENTOR.
Andrew J. Schorr
BY Elwin M. Hurley
ATTORNEY

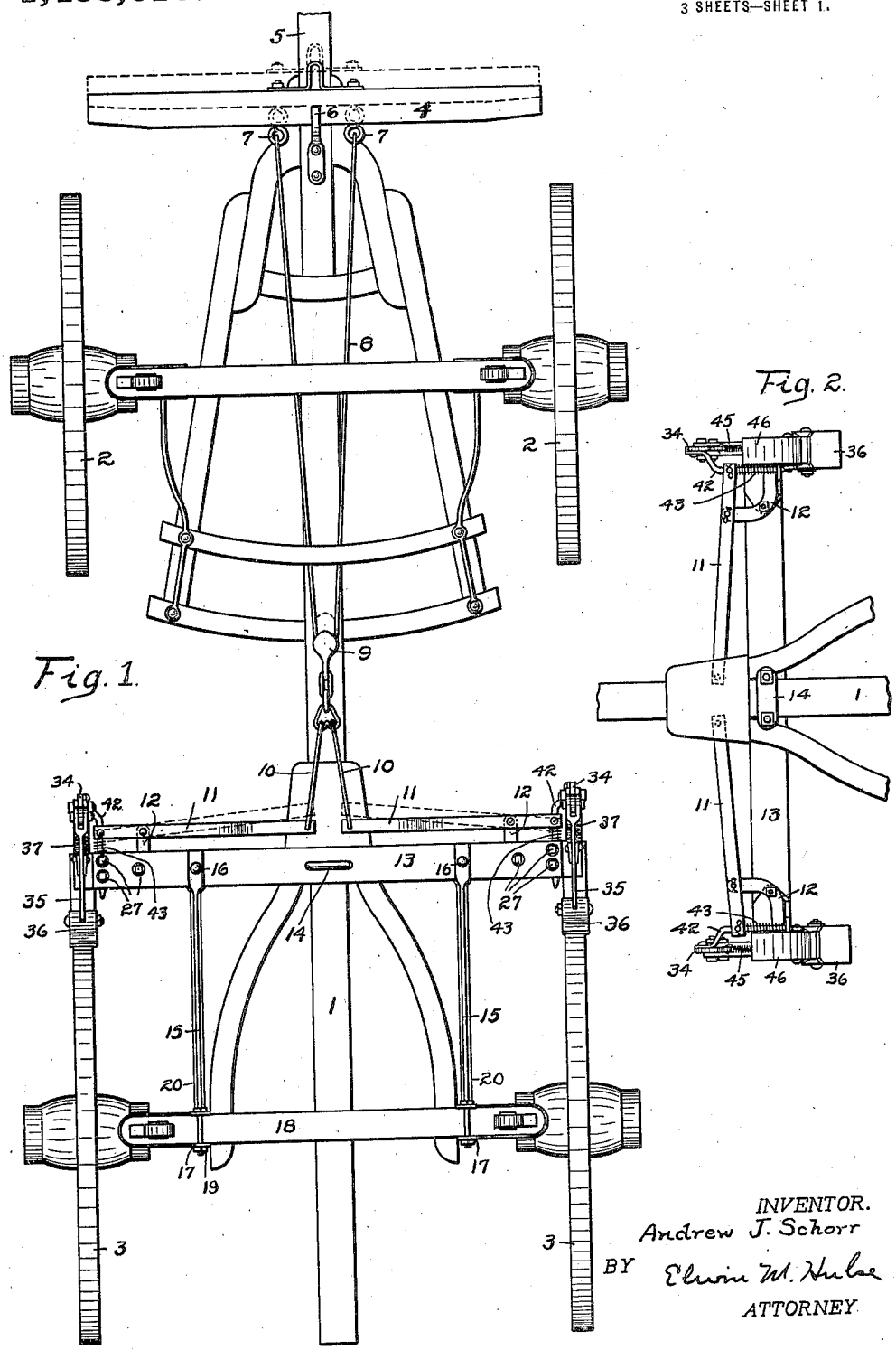

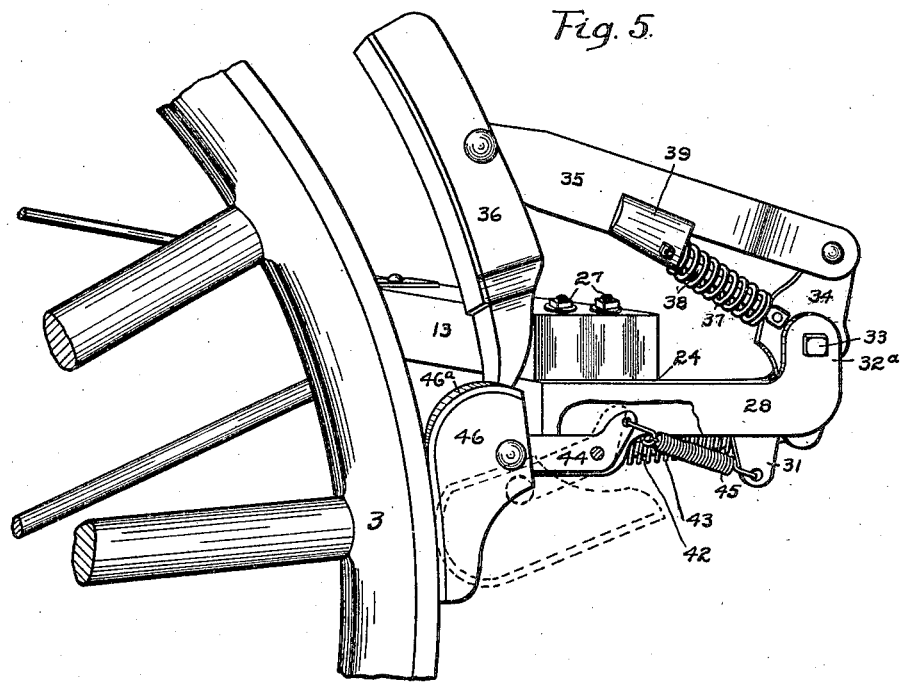
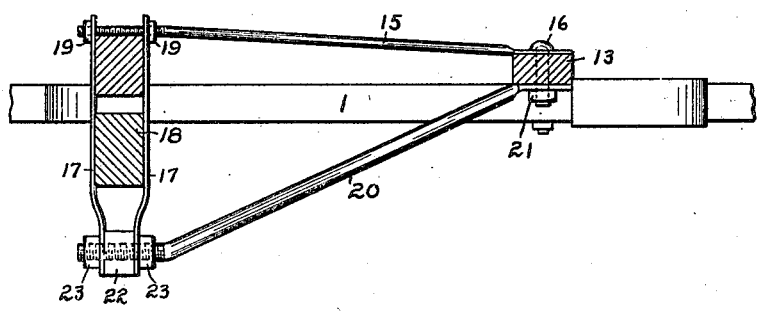
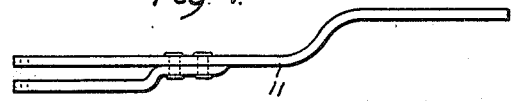

Patented Dec. 12, 1922.

1,438,613

UNITED STATES PATENT OFFICE.

ANDREW J. SCHORR, OF FORT WAYNE, INDIANA.

WAGON BRAKE.

Application filed February 24, 1920. Serial No. 360,848.

*To all whom it may concern:*

Be it known that I, ANDREW J. SCHORR, a citizen of the United States, residing at Fort Wayne, in the county of Allen and State of Indiana, have invented new and useful Improvements in Wagon Brakes, of which the following is a specification.

The invention relates to wagon brakes and particularly to improvements in wagon brakes of the type described in Patent 989,253 to A. N. Hanna, and dated April 11, 1911.

The object of the invention is to provide a simple and novel form of brake which shall exert its holding power automatically upon the wheels of a wagon or vehicle approximately proportional to the load and the grade down which the wagon is traveling and which shall be adapted to automatically lock the vehicle against retrograde movement upon an incline. Another object is to provide a support for the brake mechanism which shall rigidly secure the mechanism to the running gear of the wagon and thereby assure the operation of the brakes when required. Other objects and advantages will appear hereinafter.

In the accompanying drawings I have illustrated the invention in simple form in which Figure 1 is a plan view of the running gear of a wagon with the invention applied thereto; Figure 2 bottom view of the brake mechanism; Figure 3 a side elevational view in slight perspective of the brake mechanism in released position, the wagon being stationary; Figure 4 a similar view the downhill brakes being set; Figure 5 a similar view the up-hill brakes being set and holding the down-hill brake shoes up and out of action; Figure 6 a bottom view of one of the supports for the moving parts of the mechanism; Figure 7 a plan view of one of the actuating levers and Figure 8 a side elevational view of the bracing means by which the mechanism is held rigidly on the running gear.

Referring to the drawings, which illustrate one embodyment of the invention, the forward end of reach 1 of the running gear is suitably pivotally connected to the front axle supporting wheels 2, the rear end of the reach being suitably connected to the rear axle supporting wheels 3. A double or swingle tree 4 is slidably mounted on tongue 5 beneath the usual hammer strap 6, partly broken away in Figure 1, animal or animals being suitably secured to the swingle tree so that when it or they pull forwardly the double or swingletree will move forward on the tongue. Eye bolts 7 project rearwardly from the rear side of the swingletree at suitable points on opposite sides of the middle point of the double or swingletree and cable 8 is secured at its opposite ends to the eye bolts and is passed over a suitable sheave 9. Links 10 are suitably connected at their forward ends to the sheave their rear ends being pivotally connected to the inner ends of transverse levers 11 pivotally mounted on brackets 12 projecting forwardly from beam 13 secured to the reach by clevis 14 at a suitable point in front of rear wheels 3. Referring to Fig. 8, in order that beam 13 shall be rigidly secured to the running gear I provide two brace rods 15 secured at one end to the top of beam 13 by bolts 16, the other end of each rod being threaded and passed through aligned openings in two plates 17 on opposite sides of bolster 18, nuts 19 on each rod when tightened drawing the plates into tight contact with opposite sides of the bolster and also drawing the rod taut. I also provide two inclined rods 20 having their forward ends secured to the bottom side of beam 13 by bolts 16 and nuts 21 the rear end of each being threaded and extending through aligned openings in the lower ends of plates 17 and through a spacer 22 between the two plates, nuts 23 when tightened drawing the lower portion of the plates tightly on the bolster and on the spacer and also drawing the rod 20 taut. These braces securely anchor the beam to the running gear and prevent all relative movement of the beam with respect to the bolster or the wheels 3.

At each end of beam 13 is rigidly secured a frame casting 24 comprising a base plate 25, (Fig. 6) having apertures 26 therein for the reception of bolts 27 extended downwardly through beam 13, suitable nuts on the lower projecting ends of the bolts securing the casting in place on the beam. Two parallel and laterally spaced flanges 28 depend from the plate along its outer side and a flange 29 depends along the rear side of the plate and has an aperture 30 formed therein. An apertured lug 31 depends between and is integral with flanges 28 and an apertured lug 32 depends from each flange 28 near the rear ends thereof. A lug 32ᵃ projects upwardly from the forward end of each flange, each lug being apertured to receive a bolt 33 by which lever 34 is pivotally supported between the lugs. An arm 35 is pivoted at its forward end to lever 34, the forward end of the arm, preferably being bifurcated with the upper end of lever 34 between the bifurcations. A brake shoe 36 is pivotally supported on the rear of arm 35 and is adapted to engage the periphery of the wheel 3. Spring 37 is supported on rod 38 pivotally connected at its forward end to lever 34 at a point preferably above and rearwardly of the pivotal point 33 of the lever, the forward end of the rod being inserted in a recess formed in boss 39 on the lower side of arm 35. A pin 40 is inserted through the rear end of rod 38, its outer ends projecting into slots 41 formed in opposite sides of the boss. A link rod 42 is pivotally connected at its forward end to the lower end of lever 34 and its rear end is extended into aperture 30 in flange 29. Spring 43 is supported on rod 42, its rear end abutting flange 29 and its forward end abutting the outer end of lever 11, the lever being pivotally connected to rod 42. Preferably the outer portion of each lever 11 is bifurcated to furnish plenty of bearing surface on brackets 12 and rod 42 and avoid loose parts.

A lever 44 is pivoted between lugs 32 on flanges 28, the rear end of spring 45 being connected to the upper end of lever 44 and the forward end of the spring being connected to lug 31. A pear shaped brake shoe 46 is pivotally supported on the rear or lower end of lever 44 and spring 45 tends to rock lever 44 to cause shoe 46 to engage the periphery of wheel 3 below the horizontal plane of the axis of the wheel as shown in dotted outline in Fig. 5.

Normally when the vehicle is at rest, as shown in Fig. 3, springs 43 are expanded causing shoes 36 to move into engagement with the periphery of wheels 3. The lower end of each shoe 36 is tapered so that said end will abut shoe 46 and force it away from the wheel. The vehicle may then be backed without shoe 46 engaging the wheel. When power is applied to the double or swingle tree the tree moves forwardly drawing cable 8 with it and causing levers 11 to rock, the outer ends of the levers moving rearwardly and reciprocating rods 42 rearwardly. This movement of rods 42 rocks the upper ends of levers 34 forwardly to elevate arms 35 and shoes 36 into the position approximating that shown in Fig. 5. As soon as the lower ends of shoes 36 release shoes 46 the latter immediately swings into engagement with wheels 3, the rounded end 46$^a$ of each shoe engaging the periphery of the wheel. If the vehicle is travelling down hill and the draft on it is released springs 43 expand to restore levers 11 to normal position and rock levers 34 in the opposite direction. Shoes 36 therefore move down into engagement with wheels 3, the movement of arms 35 compressing springs 37. The greater the load on the vehicle and the steeper the grade of the road the farther down on the peripheries of the wheels will shoes 36 be carried, the limitation of said movement being when arms 35 abut the upper side of frame castings 24. It follows that the farther down the shoes are carried the greater will be the compression on springs 37 and the greater will be the holding power of shoes 36 on wheels 3. In Figure 4, I illustrate the downhill brake shoes in action, the up-hill brake shoes 46 being pushed forwardly by shoes 36.

If the vehicle is travelling up hill the draft on the vehicle will cause the down-hill brakes to be elevated as shown in Figure 5, the up-hill brakes 46 being in the position shown in dotted outline. In the event of any retrograde movement of wheels 3 the latter will rotate shoes 46 into the position shown in full line in Figure 5, that is with the long braking surface 46$^b$ in contact with the peripheries of the wheels, the grip of the shoes 46 being sufficient to prevent further retrograde movement of wheels 3. The lower ends of shoes 36 now rest on shoes 46 and, therefore, can not drop down on the wheels while shoes 46 are in action.

It will be noted that the up-hill brakes are in contact with the rear wheels of the vehicle at all times except when the down-hill brakes are in normal position or in action and that the down-hill brakes cannot move into action so long as the up-hill brakes are in action nor can the up-hill brakes move into action while the down-hill brakes are in action. The mechanism is entirely automatic in its operation and is so rigidly supported that it is highly efficient in operation.

It will be noted also that when the rounded end 46$^a$ of each up-hill brake shoe 46 engages the periphery of the rear wheel the rotation of the wheel forwardly holds the braking surface 46$^b$ of the shoe out of contact with the wheel since the wheel rubs on said rounded end and rocks the shoe forwardly on its pivot. Hence the up-hill brake can not take hold of the wheel while the wheel is rotating forwardly.

What I claim is:

1. In a wagon brake, a movable double tree, a frame, a down-hill brake shoe pivotally supported on the frame in cooperative relation with the perimeter of a wheel of the wagon, means operatively connecting the said shoe and the double tree for throwing the shoe out of action when the double tree moves in one direction, a lever pivotally supported on the frame, an up-hill brake shoe pivotally mounted on the lever, a spring connected to the lever and to the frame tending to hold the latter shoe in engagement with the perimeter of said wheel, the down hill brake shoe when in cooperative relation with the said wheel engaging the up-hill brake shoe and throwing it out of action.

2. In a wagon brake, a movable double tree, a member on the running gear of the wagon in advance of the rear wheels thereof, braces secured to the said member and to the rear bolster of said running gear for rigidity securing the said member to the running gear, a pair of frames rigidly secured to opposite ends of the said member, down-hill brake shoes and up-hill brake shoes pivotally supported on the frames respectively in cooperative relation with the perimeters of the rear wheels, means to hold each up-hill brake shoe in engagement with said wheel, the down-hill brake shoes in normal position and also when in action being adapted to engage the respective up-hill brake shoes in engagement with said wheels, the down-hill brake shoes in normal position and also when in action being adapted to engage the up-hill brake shoes and throw them out of action, and means operatively connecting the down-hill brake shoes and the double tree for simultaneously throwing the latter shoes out of action when the double tree moves in one direction.

In witness whereof, I hereunto subscribe my name this 16th. day of February, 1920.

ANDREW J. SCHORR.